United States Patent
Cline et al.

Patent Number: 5,549,731
Date of Patent: Aug. 27, 1996

[54] PREPARATION OF SOLID AGGREGATES OF HIGH DENSITY BORON NITRIDE CRYSTALS

[76] Inventors: Carl F. Cline, 728 Liquidamber Dr., Danville, Calif. 94506; Mark W. Wilkins, 6 Greens La., Pleasanton, Calif. 94566; Alan W. Hare, 2136 E. Lindberg Rd., Port Angeles, Wash. 98362

[21] Appl. No.: 334,762

[22] Filed: Dec. 21, 1994

[51] Int. Cl.$^6$ ............ C22C 29/14; C06B 21/00; B29C 43/00
[52] U.S. Cl. ............ 75/244; 264/3.1; 264/84; 501/96; 423/290
[58] Field of Search ............ 264/3.1, 84; 501/96; 75/243, 244; 423/290

[56] References Cited

U.S. PATENT DOCUMENTS

| | | | |
|---|---|---|---|
| 2,947,617 | 8/1960 | Wentorf, Jr. | 51/307 |
| 3,608,014 | 9/1971 | Balchan et al. | 264/84 |
| 4,014,979 | 3/1977 | Dremin et al. | 423/290 |
| 4,201,757 | 5/1980 | Corrigan | 423/290 |
| 4,231,980 | 11/1980 | Corrigan | 264/84 |
| 4,695,321 | 9/1987 | Asashi et al. | 75/243 |
| 5,108,966 | 4/1992 | Holt et al. | 501/96 |
| 5,271,726 | 12/1993 | Bergmann et al. | 425/1 |

*Primary Examiner*—Peter A. Nelson

[57] ABSTRACT

Method and apparatus for compaction of powder of high density boron nitride, having an initial particle diameter of at least two microns, into a high density crystal aggregate of between 1 mm up to about 1 cm in diameter, the resulting crystal aggregate having a zincblende form, the wurtzite form or mixtures of the zincblende and wurtzite forms. High density aggregates of boron nitride, preferably having particle sizes with diameters at least 2 μm, are placed in a hollow, substantially cylindrical first container of metal, and the first container is surrounded by a fluid-like material of metal or metal powder having a shock wave velocity V. The first container and fluid-like material are placed in a substantially cylindrical second container that is purged of substantially all air and sealed. The second container has a rigid side wall and two rigid end walls. A high explosive, having a detonation velocity D of at least 6 km/sec and preferably at least 8 km/sec, is positioned at one end wall and along at least a portion of the side wall of the second container. The high explosive is detonated, and an approximately radially directed pressure wave moves through the fluid-like material and the boron nitride powder toward the center of the second container. A second, approximately radially directed pressure wave, separated in time from the first pressure wave, subsequently moves outward through the fluid-like material and the boron nitride powder. These two pressure waves produce boron nitride aggregates of density at least 95 percent of the theoretical maximum density (3.49 gm/cm$^3$) and of sizes at least 1 mm in diameter. A solid mandrel can be positioned near a center line of the second container to improve the quality of the resulting product. Grain sizes as small as 0.005–0.05 gm are produced. Boron nitride aggregates with Knoop hardness parameters in the range of 4300–5000 Kgm/mm$^2$ can be produced in this manner.

22 Claims, 3 Drawing Sheets

PREPARATION OF SOLID AGGREGATES OF HIGH DENSITY BORON NITRIDE CRYSTALS

FIELD OF THE INVENTION

This invention relates to production of solid aggregate crystals of boron nitride crystals by a shock wave process.

BACKGROUND OF THE INVENTION

Both boron nitride and carbon have a soft hexagonal form that can be converted under high pressure to either of two hard forms: (1) a cubic form with a zincblende crystalline structure; and (2) a hexagonal form with a wurtzite crystalline structure. The specific gravities of these forms are 2.28 (soft), 3.49( hard, cubic, zincblende) and 3.49 (hard, hexagonal, wurtzite). These forms of boron nitride ("BN") are often referred to as low density BN, cubic BN (C-BN) and wurtzite BN (W-BN), respectively.

To produce high density BN, one can apply static or dynamic high pressures to low density BN and produce small aggregates of high density BN with diameters no higher than 100 microns (µm). Many commercial applications of high density BNrequire aggregates of sizes much larger than 100 µm.

Axial propagation of a shock wave through brittle, inorganic powders (≈4500 µm in diameter) is disclosed in U.S. Pat. No. 3,367,766, issued to Barrington and Bergmann. The materials used include alumina, barium ferrite, barium titinate, silicon carbide, boron carbide, magnesium oxide, titanium carbide and bismuth telluride. The shock wave is produced by detonation of an explosive contiguous with one end of a container for the powder to be aggregated.

A method of bonding together diamond powder particles, using shock waves, is disclosed by Dunnington in U.S. Pat. No. 3,399,254. The powder sample is confined in the interior of a hollow, flat slab or disk, and one broad, flat face of this container is impacted by an explosively-driven flyer plate or projectile. The shock wave pressures used here are limited to modest pressures (≈300 kilobars), due to sample recovery problems.

Cowan and Holtzman, in U.S. Pat. No. 3,401,019, disclose a method for producing a shock wave of sufficient intensity to convert carbon to diamond initially, using a contiguous cooling medium that keeps the material. temperature of the shocked material below 2000° C., preferably below 1800° C. The cooling medium must have sufficient thermal conductivity that excessive graphitization does not occur after release of the shock wave pressures. This patent notes that a straightforward shock synthesis cannot produce satisfactory yields of diamond, due to excessive graphitization of the diamond. After release of the shock wave pressures, the diamond is initially hotter than the carbon from which it is formed. The inventors begin with carbon, preferably in graphite form, already compacted to about 75 percent. of the theoretical density for diamond, and apparently allow the chosen cooling medium to surround and fill the interstitial regions of the partly compacted graphite. This admixture is then subjected to a shock wave of at least 750 kilobars, preferably at least 1,000–2,000 kilobars. This approach begins with graphite and requires application of very high shock wave pressures to convert the starting material to diamond.

U.S. Pat. No. 3,568,248, issued to Cowan, discloses an end closure or plug for a cylindrical container of material that is to be subjected to a shock wave. The plug includes a first, substantially cylindrically shaped section in contact with the sample at a plug end along the longitudinal axis of the cylinder. The end plug material has a shock impedance (the product of initial material density and shock wave velocity in the material) equal to the shock impedance of the sample. A second section of the plug, in contact with the first section along the cylinder longitudinal axis, has the same shock impedance as the first section and is arranged to carry off most of the longitudinally propagating shock wave energy by spallation at an exposed end of this second section. In one embodiment, the first section has gradually decreasing porosity as one moves away from the sample toward the section section, and the second section has gradually increasing porosity as one continues in the same direction. This patent assumes that the shock wave will move primarily along the cylinder longitudinal axis.

Balchan and Cowan, in U.S. Pat. No. 3,667,911, disclose a method of shock wave treatment of a solid material, such as diamond, boron nitride or silicon carbide powder, by propagating a shock wave axially along the sample at substantially uniform velocity. The sample's physical extension in this wave propagation direction is much greater than the sample's physical extension in any transverse direction. The shock wave is generated (1) by impacting the sample at one end with an explosively driven impact plate or (2) by detonating a high explosive in contact with the sample at one end. The sample may be positioned in a container. Ideally, the shock wave is planar, with the defining plane being perpendicular to the axial direction of shock wave propagation, and the shock wave energy is sufficient that the associated wave pressure is substantially constant throughout this perpendicular plane. The sample's axial length should substantially exceed the distance ("start-up length") required to establish shock wave steady state conditions; the start-up length is approximately five times the transverse diameter of the sample. Alternatively, a solid material, having the same density, shock impedance and transverse diameter at the sample and having an axial length at least as large as the start-up length, should be provided at an axial location between, and in contact with both of, the sample and the explosive for application of the pressure pulse that produces the shock wave. Details of propagation of a shock wave in any direction differing substantially from the axial direction (e.g., in a radial direction) are not discussed, and such propagation would probably be inconsistent with application of this invention. This patent contains a good mathematical discussion of the generation and propagation of shock waves in a solid material.

A method of aggregating small, hard particles, such as diamond, into larger aggregates by passage of shock waves therethrough is disclosed by Balchan and Cowan in U.S. Pat. No. 3,851,027. The sample particles are dispersed interstitially in a carrier matrix having smaller porosity that has smaller porosity and larger post-shock deformability than the interstitial particles. The carrier matrix is usually formed as a slab or disk, and one broad, flat face of the matrix is impacted by an explosively-driven projectile or driver plate to produce a shock wave that travels through the carrier matrix/interstitial particles combination and bonds many of the interstitial particles together. It appears that the hard particles are intended to coalesce. into a plurality of larger size aggregates. Use of the carrier matrix apparently is intended to prevent aggregation of all the hard particles into a single mass. The hard particles that are bondable by this technique are asserted to include diamond, boron nitride, silicon carbide and silicon nitride. Pressures of 100 kilobars and higher from an axially propagating shock wave are used for this purpose.

Two U.S. Pat. Nos. 4,201,757 and 4,231,980, issued to Corrigan, disclose use of an explosively-driven flyer plate to generate shock waves in low density boron nitride to produce the high density wurtzite form of boron nitride. The impact of the flyer plate on one surface of the boron nitride is arranged to produce a shock wave in the longitudinal axis (C-axis) direction, as usual. The Corrigan patents assert that the shock compression "snaps" the low density boron nitride from a loosely packed crystalline form into a high density, close-packed form of boron nitride. The technique is apparently orientation dependent, because the inventor emphasizes that the shock wave must be directed along the C-axis of the soft form of the material. The shock wave pressure used in the Corrigan patents is 100–500 kilobars and is applied to the low density form of recrystallized pyrolytic boron nitride, rather than to the high density forms of the boron nitride. The size of boron nitride aggregates produced is about 100 µm.

None of these patents discloses and seriously discusses generation and propagation of radial shock waves through a sample. Most of these patents begin with the sample material in powder form, not as small aggregates to be further aggregated into larger size aggregates. In particular, the techniques disclosed in these patents do not produce high density aggregates of size larger than about 100 µm. What is needed is an approach that will produce high density aggregates of boron nitride with diameters up to 1 cm.

SUMMARY OF THE INVENTION

The invention provides method and apparatus for producing high density boron nitride aggregates with diameters up to 1 cm, and possibly higher. In one embodiment, the method includes the steps of: (1) providing high density boron nitride aggregates ($\geq 2$ µm in diameter) inside a first substantially cylindrical container; (2) surrounding the first container on all sides and ends with a selected fluid-like material, such as a metal powder of moderate relative density; (3) surrounding the fluid-like material and the first container with a second, substantially cylindrical, rigid container that is closed at both ends, is in contact with the fluid-like material, and has its interior purged of substantially all air; (4) surrounding the second container on all side walls and one end wall with a selected amount of high explosive having a detonation velocity D that is much greater than the shock wave velocity V within the fluid-like material; and (5) detonating the high explosive at the end wall of the second container.

DETAILED DESCRIPTION OF THE INVENTION

Figure 1:
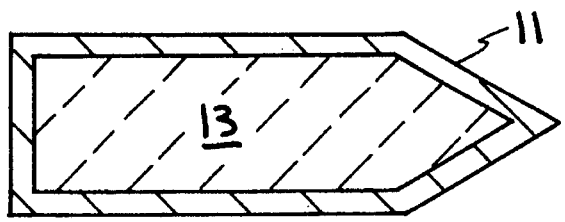
FIG. 1 illustrates one configuration for certain tubes containing the boron nitride aggregates or powder according to the invention.

The invention provides method and apparatus for using explosively-generated shock waves in certain fluid-like materials to produce large solid aggregate crystals of high density boron nitride. FIG. 1 shows the interior of a hollow, rigid, substantially cylindrical or tubular first container 11, composed of copper or aluminum or some other suitable metal, that is filled with high density boron nitride aggregates or powder 13 and is evacuated to a pressure of less than $10^{-5}$ Torr, and preferably to a pressure of $10^{-7}$ Torr or less. The first container 11 is closed and the container contents are sealed therein by pinching off the tube at both ends to exclude substantially all gases and to provide an airtight container. The boron nitride material 13 will initially have a density of about 50 percent or more of the theoretical maximum density of solid, high density boron nitride (3.49 µm/cm$^3$).

Figure 2:
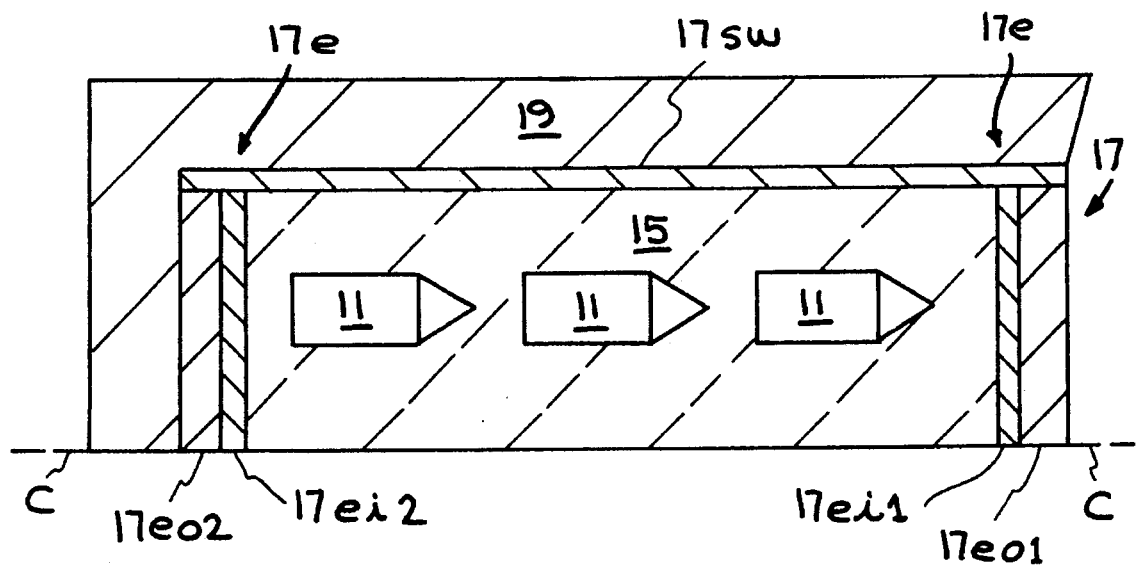
FIGS. 2 and 3 are schematic cross-sectional side views of first and second embodiments of the invention.

One or more tubes 11 is surrounded by a selected fluid-like, pressure-transmitting material 15, such as a low strength copper or aluminum powder of about 50 percent normal solid density, as in FIG. 2. A hollow, substantially cylindrical or tubular second container 17 is filled with the fluid-like material 15 and one or more tube(s) 11. The tube 17 may have a side wall 17sw of hard metal, such as steel, of thickness 0.2–1.0 cm, preferably 0.3–0.7 cm, and in one embodiment has an outer diameter of about 6.3 cm. In a preferred embodiment, the tube 17 should have two outer end walls 1.7e01 and 17e02, each of thickness preferably about 1–6 cm, preferably 3–5 cm, made of a hard material such as steel. This tube 17 should have two inner end walls 17ei1 and 17ei2 facing each other, each of thickness preferably about 1–3 cm, made of a softer material, such as Mg or Al or Cu. The tube side wall 17sw and one outer end wall 17o1 are partly or fully surrounded by a contiguous high explosive 19 that may be 7–12 cm thick in a preferred embodiment.

Figure 3:
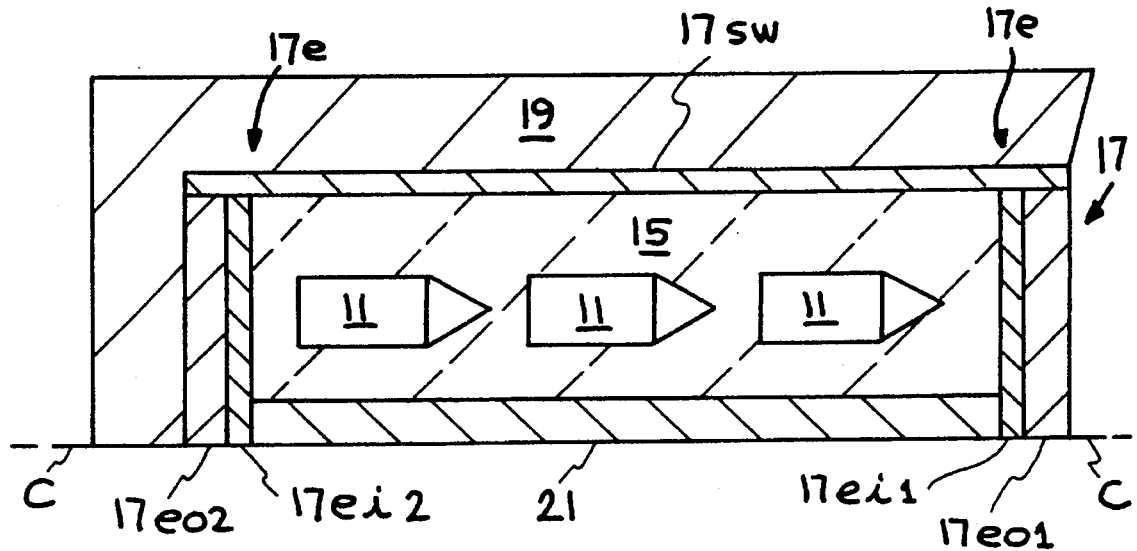

In one embodiment, illustrated in FIGS. 2 and 3, the combination of rigid tube(s) 11 and fluid-like material 15 extends from the center line CC outward to the inner boundaries of the tube 17. In a second embodiment, illustrated in FIG. 3, a solid, substantially cylindrical mandrel 21 of metal is positioned at a central core of the interior of the tube 17. The mandrel 21 of the second embodiment is preferably used when the fluid-like material 15 is a powder but may also be used when the fluid-like material is another material, for example a heavy liquid such as mercury.

Figure 4:
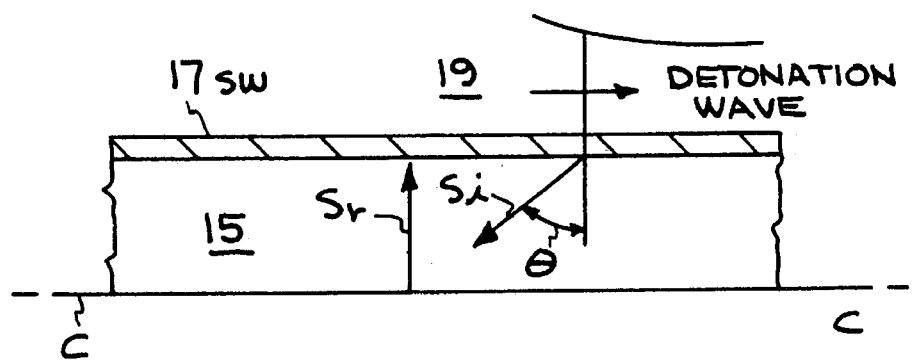
FIG. 4 illustrates movement of initial and reflected shock waves produced in the apparatus of the invention.
Figure 8:
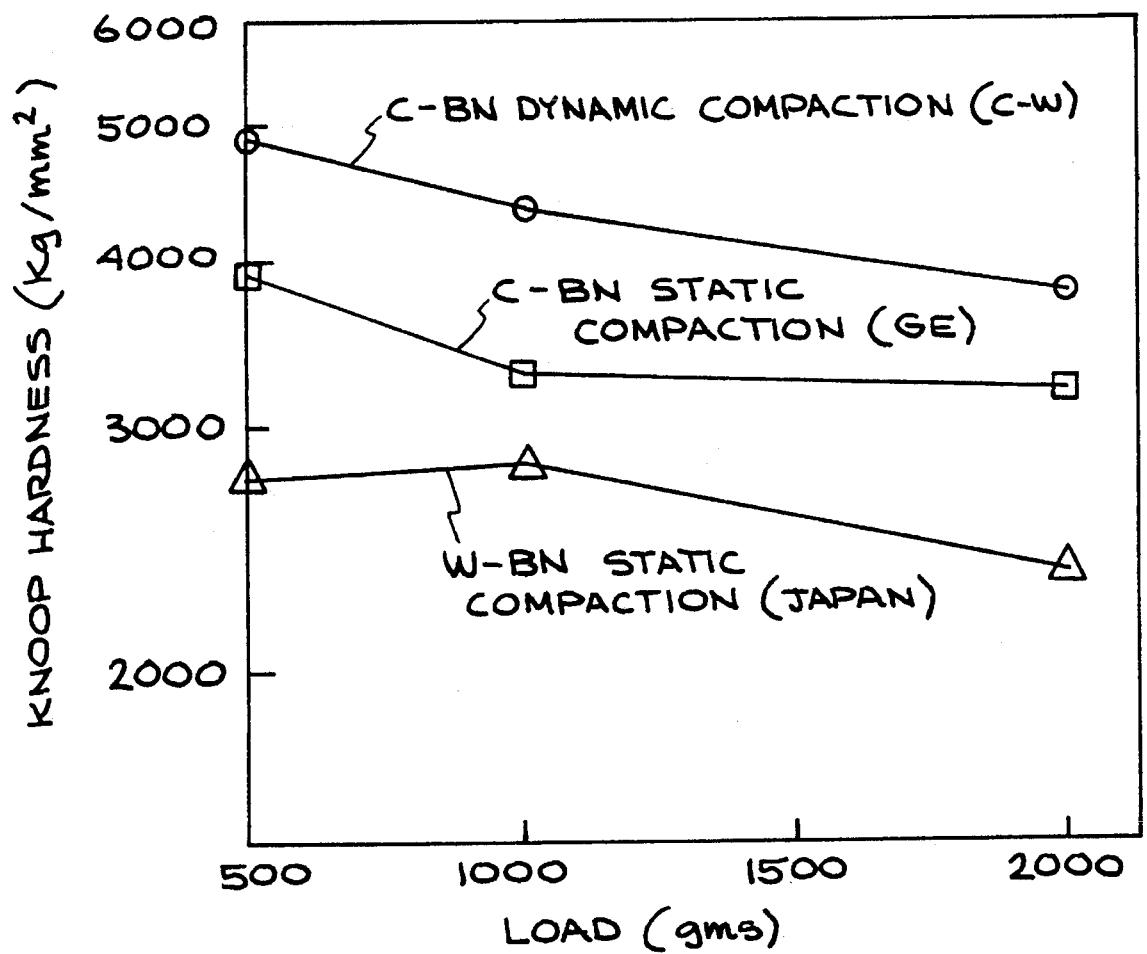
FIG. 8 is a graphical view comparing Knoop hardness parameters for dynamically compacted high density material, produced by the invention, with statically produced high density BN material produced by two other processes.

In either the first or second embodiments shown in FIGS. 2 and 3, the high explosive 19 is detonated at or adjacent to one end wall 17o1, and the detonation wave subsequently sweeps longitudinally along the side wall 17sw of the tube 17, as shown in FIG. 4, thereby imploding the tube side wall toward the center line CC and producing a radially converging shock wave in the combination of fluid-like material 15 and tube(s) 11. The high explosive detonation velocity D is chosen to be much greater than the shock wave velocity V for the fluid-like material 15. Thus, the initial shock wave moves in an approximately radial direction $r_i$, as shown in FIG. 4 with an incidence angle $\theta \approx 0°$, and produces a "reflected" shock wave moving outward in an approximately radial direction. We have found that use of a fluid-like material 15 that is a powdered metal, such as copper or aluminum, or a higher density powder such as iron, tungsten, tungsten carbide or uranium, allows shock waves of higher intensity to be transmitted to the tube(s) 11, as compared to replacement of the fluid-like material 15 by a solid or liquid material.

Figure 5:
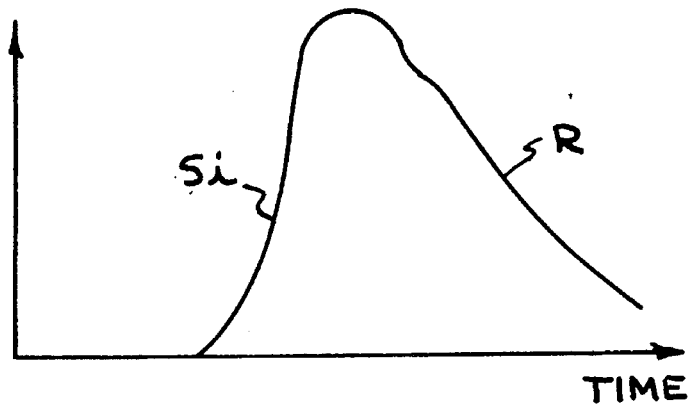
FIGS. 5, 6 and 7 are graphs illustrating development of local pressure versus time at a representative location in a fluid-like material used in three embodiments of the invention.

If the embodiment of FIG. 2 is employed, with no central, solid mandrel 21 as in FIG. 3, the radially converging shock wave (moving in the direction $r_i$) drills or otherwise produces a central channel in the combined tube filler 11 and 15 when the incoming shock wave $S_i$ reflects as a shock wave $S_o$ from or near the central line CC. The reflected shock wave $S_o$ may have a higher amplitude than the incoming shock wave $S_i$, and the reflected shock wave $S_o$ moves (approximately) radially outward, producing a pressure versus time profile shown in FIG. 5 for a location displaced from the center line CC. The incoming pressure wave $S_i$ pre-compresses the boron nitride aggregate 13, and the reflected pressure wave $S_o$ compresses the boron nitride material further, to this material's approximate final density $\rho_f$. This final density pf should be at least 95 percent of the theoretical maximum. density (3.49 gm/cm$^3$) of boron nitride (i.e., at least 3.31 gm/cm$^3$).

Figure 6:
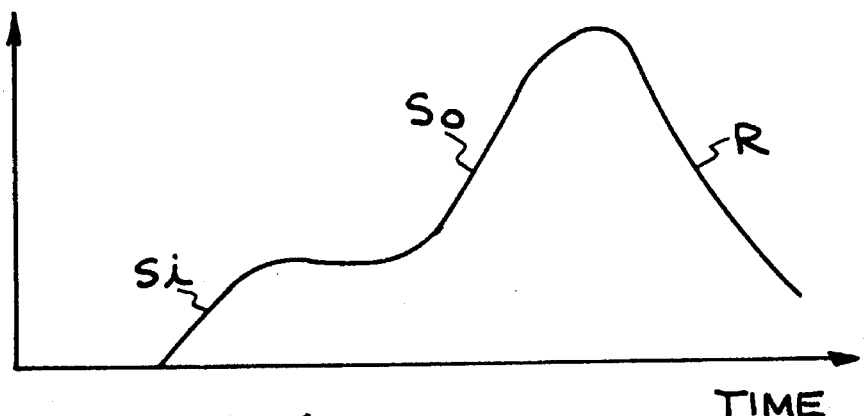

The boron nitride aggregate 13 is transformed permanently into large aggregate crystals of high density boron nitride of diameter as large as 1 cm, or even greater in some instances. After the passage of additional time (a few microseconds), one or more release waves $S_r$ passes through the boron nitride material 13 and decreases the local pressure to approximately ambient conditions. When a tube 11 is placed on the center line CC, only a single pressure peak occurs, as indicated in FIG. 6. This single peak is of extraordinary amplitude and is of little value for the production of stable, large aggregate, high density crystals of boron nitride.

Figure 7:
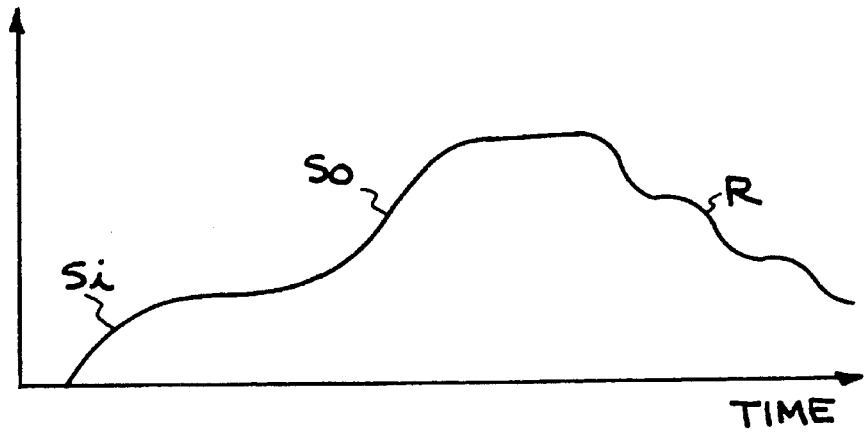

If the embodiment of FIG. 3 is employed, with a solid mandrel located at or near the center line CC, the (approximately) radial shock wave again produces a two-stage rise in pressure at any location outside the mandrel 21 and within the tube 17, as illustrated in FIG. 7. Use of two pressures pulses in succession, rather than a single higher amplitude wave, causes less local heating of the boron nitride aggregate, and the resulting aggregate has a higher density (95 percent of the theoretical maximum density) and other superior properties. Very high axial velocity material flow is disruptive to formation of high density boron nitride aggregates in the tubes 11. The ratio D/V of detonation velocity to shock wave velocity is preferably at least 2–3, to provide approximately radially directed presure waves $S_i$ and $S_o$. For a ratio D/V 2, the estimated initial incidence angle θ that a force vector $S_i$ makes with a radial line is $\theta \cot^{-1}(D/V)$.

The dynamically formed, high density aggregates of boron nitride crystals also have hardness properties superior to statically formed high density boron nitride aggregates, as indicated in FIG. 7. The Knoop hardness, measured in Kgm/mm$^2$, is compared for (1) dynamically compacted, crystalline form BN, produced by the invention, (2) statically produced, crystalline form BN (C-BN), and (3) statically produced, wurtzite form BN (W-BN), for point loads of 500, 1000 and 2000 gms. The dynamically compacted high density BN material has higher Knoop hardness parameter of about 3800, 4300 and 5000 Kgm/mm$^2$ at these three point load values, which is higher by 800–2000 Kgm/mm$^2$ than either of the statically produced high density BN materials for the same point load. Based upon the Knoop hardness parameter, the dynamically compacted high density B N material is superior to these other two BN materials.

The separation in time !t of the maxima of the two pressure waves $S_i$ and $S_o$ is controlled partly by the radial distance of the pressure measurement location from either the center line CC (FIG. 2 embodiment) or the radial boundary of the mandrel 21 (FIG. 3 embodiment). The two pressure local maxima shown in each of FIGS. 5 and 7 should be separated in time by as much as possible, preferably at least 3–5 sec, so that (1) shock wave pressure is applied to the BN material for as long as possible and (2) the time interval between these two maxima allows the BN material to settle into a first compressed state before the second pressure wave $S_o$ arrives. We have found that the best radial location for the tube 11 is about approximately mid-way between the center line CC (or mandrel edge) and the initial inner diameter of the side wall 17sw or the tube 17.

We have found that large aggregate crystals of high density BN crystals are best produced if the second pressure wave $S_o$ has a pressure pulse amplitude in the range of 500–750 kilobars, with the pressure pulse amplitude of the first pressure wave $S_i$ being somewhat less than this number. The large aggregate crystals of boron nitride thus produced are primarily composed of small grain regions whose slip planes are randomly oriented relative to each other. Cleavage occurs only with great difficulty in such aggregates. By varying (i) the initial size of the BN powder, (ii) the placement of the tubes of BN powder relative to the center line CC of the assembly, (iii) the amplitude of the second pressure pulse $S_o$ and (iv) the minimum time interval !t separating passage of the first and second pressure pulses across the B N powder, grains in the BN crystal aggregates with diameters as small as 0.005 –0.05 m can be produced. These grains are exceptionally strong and may manifest Knoop hardness parameters that are greater than the Knoop values shown in FIG. 7.

The pressure-transmitting, fluid-like material 15 in FIGS. 2 and 3 may be a metal, such as copper, aluminum, iron, tungsten, tungsten carbide or uranium, in powder or other fluid-like form. Use of a powder increases the pressure amplitudes of the shock waves $S_i$ and $S_o$ transmitted through the fluid-like material. This results in a controllably lower shock wave velocity in a powder (preferably ∂3 km/sec) than in a solid of the same material.

The high explosive detonation velocity D should be at least 6 km/sec and should preferably be at least 8 km/sec in order to best achieve aggregation into large crystals of high density BN. These detonation velocities may be achieved with mixtures such as pentolite (60% PETN/40% TNT), or with single-component explosive, such as PETN or RDX, that has detonation velocities as high as 9 km/sec. High explosives with detonation velocities D=6–8 km/sec will often produce the appropriate shock waves for large BN crystal aggregation, but detonation velocities D>6 km/sec are usually unsatisfactory here. This may be due to the greater interaction of radial pressure waves, produced by the high explosive detonation on the side walls, with the longitudinal pressure waves moving in the fluid-like material.

The fluid-like material 15 is preferably a powdered metal with a density of 0.3–0.7 times the solid material density. With these choices of materials, the amplitude of the initial pressure wave $S_i$ is about 500–600 kilobars. With these pressure wave amplitudes, the aggregate BN can be consolidated to 95–99 percent of its theoretical maximum density.

C. A. Brookes, in "The Mechanical Properties of Boron Nitride—A Perspective View", Second International Conference on Hard Materials, Rhodes, Greece, Sep. 23–28, 1984, has compared Knoop indentation hardness of cubic boron nitride with Knoop hardness of two types of diamond, taken along different crystallographic directions. The Knoop hardness of cubic boron nitride is 29–43 kilonewtons/mm$^2$, depending upon applied stress plane and direction. Knoop hardnesses of the diamonds are 1.4–2.5 times that of the cubic form boron nitride (C-BN). Using the conventional Mohs scale with a range of 1–10, it would be difficult to distinguish the Mohs hardness of C-BN from the Mohs hardnesses of these diamonds.

We claim:

1. A method for compaction of powder of high density boron nitride, having an initial particle diameter of at least two microns, into a high density crystal aggregate of between 1 mm up to about 1 cm in diameter, the method comprising the steps of:

providing boron nitride high density powder, with a bulk density of at least 40 percent of the theoretical maximum density, inside a substantially cylindrical first container;

surrounding the first container on all sides with a hollow, substantially cylindrical second container that has a rigid side wall and two rigid end walls;

surrounding the first container on all sides within the second container with a selected fluid-like material, having a characteristic shock wave velocity V, that extends between the first container and the second container, where the second container is purged of substantially all gases and is sealed;

placing a selected amount of a selected high explosive material at one end wall and along at least a portion of the side wall of the second container to form a connected mass of high explosive material, where the high explosive has a detonation velocity D that is much greater than V;

detonating the high explosive at the end wall of the second container; and allowing a shock wave generated by the detonation wave of the high explosive to move approximately radially inward through the fluid-like material and the boron nitride powder and then approximately radially outward through the boron nitride powder and the fluid-like material so that the boron nitride powder forms crystal aggregates, with a portion of these aggregates having at least one of a zincblende form and a wurtzite form, and these aggregates having a Knoop hardness parameter of at least 4300 Kgm/mm$^2$ for point loads up to 1000 gm.

2. The method of claim 1, wherein said second container has a central line in said container's interior, further comprising the step of positioning said first container away from the central line of said second container.

3. The method of claim 2, further comprising the step of positioning said first container approximately haft way between said central line and said side wall of said second container.

4. The method of claim 1, wherein said second container has a central line in said container's interior, further comprising the steps of:

positioning a substantially cylindrical mandrel on the central line; and positioning said first container away from the central line of the mandrel.

5. The method of claim 1, further comprising the step of selecting said fluid-like material from a class of metals consisting of copper, aluminum, iron, tungsten, tungsten carbide and uranium.

6. The method of claim 1, further comprising the step of choosing said fluid-like material to have a shock wave velocity V no greater than 2 km/sec.

7. The method of claim 1, further comprising the step of choosing said high explosive material and said fluid-like material so that the ratio D/V is at least 4.

8. The method of claim 1, further comprising the step of choosing said high explosive material to have a detonation velocity D of at least 6 km/sec.

9. The method of claim 1, further comprising the step of choosing said high explosive material to have a detonation velocity D of at least 8 km/sec.

10. A product produced by the process recited in claim 1.

11. A product produced by the process recited in claim 4.

12. Apparatus for compaction of powder of high density boron nitride, having an initial particle diameter of at least two microns, into a high density crystal aggregate of between 1 mm up to about 1 cm in diameter, the resulting crystal aggregate having a zincblende form, the wurtzite form or mixtures thereof, the apparatus comprising:

a substantially cylindrical first container;

a selected amount of boron nitride high density powder, with a bulk density of at least 40 percent of the theoretical maximum density, positioned inside the first container;

a hollow, substantially cylindrical second container that has a rigid side wall and two rigid end walls, surrounding the first container;

a selected fluid-like material, having a characteristic shock wave velocity V, that surrounds the first container on all sides within the second container and that extends between the first container and the second container, where the second container is purged of substantially all gases and is sealed;

a selected amount of a selected high explosive material positioned at one end wall and along the side wall of the second container to form a connected mass of high explosive material, where the high explosive has a detonation velocity D that is much greater than V; and detonator means for detonating the high explosive at the end wall of the second container, and for allowing shock waves generated by the detonation wave of the high explosive to move approximately radially inward through the fluid-like material and the boron nitride powder and then approximately radially outward through the boron nitride powder and the fluid-like material, whereby the boron nitride powder forms crystals aggregates, with a portion of these aggregates having at least one of a zincblende form and a wurtzite form, and with these aggregates having a Knoop hardness parameter of at least 5000 Kgm/mm$_2$ for point loads of up to 1000 gm.

13. The apparatus of claim 12, wherein said first container is positioned so that the radially inward movement of said shock wave through said boron nitride powder and the radially outward movement of said shock wave through said boron nitride powder are separated by a time interval of at least 3 μsec.

14. The apparatus of claim 12, wherein said radially outward moving shock wave moves through said boron nitride powder with a pressure pulse amplitude in the range of 500–750 kilobars.

15. The apparatus of claim 12, wherein said fluid-like material is selected from a class of metal powders of density at least 30 percent of solid density and consisting of copper, aluminum, iron, tungsten, tungsten carbide and uranium.

16. The apparatus of claim 12, wherein said second container has a central line in said second container's interior and said first container is positioned so that no portion of said first container intersects the central line of said second container.

17. The method of claim 16, wherein said first container is positioned approximately half way between said central line and said side wall of said second container.

18. The apparatus of claim 15, wherein said second container has a central line in said container's interior, a substantially cylindrical mandrel is positioned on the central line, and said first container is positioned so that said first container does not contact the mandrel.

19. The apparatus of claim 12, wherein said fluid-like material is selected from a class of metals consisting of copper, aluminum, iron, tungsten, tungsten carbide and uranium.

20. The apparatus of claim 12, wherein said high explosive material and said fluid-like material are selected so that the ratio D/V is at least 2.

21. The apparatus of claim 12, wherein said high explosive material is selected to have said detonation velocity D of at least 6 km/sec.

22. A method for compaction of powder of high density boron nitride into a high density crystal aggregate of between 1 mm up to about 1 cm in diameter, the method comprising the steps of:

provioding boron nitride high density powder, with a bulk density of at least 40 percent of the theoretical maximum density, inside a substantially cylindrical first container;

surrounding the first container on all sides with a hollow, substantially cylindrical second container that has a rigid side wall and two rigid end walls;

surrounding the first container on all sides within the second container with a selected fluid-like material, having a characteristic shock wave velocity V, that extends between the first container and the second container, where the second container is purged of substantially all gases and is sealed;

placing a selected amount of a selected high explosive material at one end wall and along at least a portion of the side wall of the second container to form a connected mass of high explosive material, where the high explosive has a detonation velocity D that is much greater than V;

detonating the high explosive at the end wall of the second container; and allowing a shock wave generated by the detonation wave of the high explosive to move approximately radially inward through the fluid-like material and the boron nitride powder and then approximately radially outward through the boron nitride powder and the fluid-like material so that the boron nitride powder forms crystal aggregates, with a portion of these aggregates having at least one of a zincblende form and a wurtzite form, and these aggregates having minimum grain sizes in the range 0.005–0.05 µm.

* * * * *